United States Patent
Grosch et al.

(10) Patent No.: US 6,548,714 B1
(45) Date of Patent: Apr. 15, 2003

(54) METHOD FOR PRODUCING POLYETHEROLS BY RING-OPENING POLYMERISATION OF ALKYLENE OXIDES

(75) Inventors: Georg Heinrich Grosch, Bad Dürkheim (DE); Harald Larbig, Ludwigshafen (DE); Reinhard Lorenz, Limburgerhof (DE); Dieter Junge, Frankenthal (DE); Kathrin Harre, Dresden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/744,512

(22) PCT Filed: Aug. 25, 1999

(86) PCT No.: PCT/EP99/06222

§ 371 (c)(1),
(2), (4) Date: Jan. 24, 2001

(87) PCT Pub. No.: WO00/14142

PCT Pub. Date: Mar. 16, 2000

(30) Foreign Application Priority Data

Sep. 5, 1998 (DE) .......................................... 198 40 585

(51) Int. Cl.$^7$ .......................... C07C 41/00; C07C 43/00
(52) U.S. Cl. ...................... 568/679; 568/671; 568/672; 568/689
(58) Field of Search ................ 568/679, 671, 568/672, 689

(56) References Cited

U.S. PATENT DOCUMENTS

| | | | |
|---|---|---|---|
| 3,278,457 A | 10/1966 | Milgrom | |
| 3,278,458 A | 10/1966 | Belner | |
| 3,278,459 A | 10/1966 | Herold | |
| 3,427,256 A | 2/1969 | Milgrom | |
| 4,962,237 A | 10/1990 | Laycock | |
| 5,136,106 A | * 8/1992 | King | .......................... 568/618 |
| 5,326,891 A | 7/1994 | Brever et al. | |
| 5,523,386 A | 6/1996 | Le-Khac | |
| 5,561,217 A | 10/1996 | Weyer et al. | |
| 5,576,451 A | 11/1996 | Trius Oliva et al. | |
| 5,679,764 A | * 10/1997 | Pazos | .......................... 528/405 |
| 5,773,525 A | 6/1998 | Pazos | |

FOREIGN PATENT DOCUMENTS

| | | |
|---|---|---|
| DE | 148957 | 6/1981 |
| DE | 203734 | 11/1983 |
| DE | 203735 | 11/1983 |
| DE | 4034305 | 4/1992 |
| DE | A-4115149 | 11/1992 |
| DE | A-4122200 | 1/1993 |
| DE | A-4137317 | 5/1993 |
| DE | A-4242017 | 6/1994 |
| EP | A-268922 | 6/1988 |
| EP | A-604840 | 7/1994 |
| WO | WO 92/11224 | 7/1992 |
| WO | WO 94/11331 | 5/1994 |

OTHER PUBLICATIONS

PCT Search Report Dated Jan. 14, 2000.

* cited by examiner

*Primary Examiner*—Johann Richter
*Assistant Examiner*—Elvis O. Price
(74) *Attorney, Agent, or Firm*—Fernando A. Borrego

(57) ABSTRACT

A process for preparing polyetherols by ring-opening polymerization of alkylene oxides onto H-functional initiator molecules comprises at least one process step a) in which a compound of the formula (I)

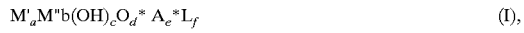

is applied to a solid inert support or incorporated in the latter or molded to form a shaped body is used as catalyst, and at least one process step b) in which a multimetal cyanide compound of the formula (II)

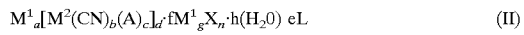

is applied to a solid, inert support or incorporated in the latter or molded to form a shaped body or in powder or paste form is used as catalyst.

5 Claims, No Drawings

METHOD FOR PRODUCING POLYETHEROLS BY RING-OPENING POLYMERISATION OF ALKYLENE OXIDES

This is the National Phase Application of PCT/EP99/0622, filed Aug. 25, 1999.

The present invention relates to a process for preparing polyether alcohols by ring-opening polymerization of alkylene oxides and to the use of the polyetherols.

Polyether alcohols are important starting materials in the production of polyurethanes. They are usually prepared by catalytic addition of lower alkylene oxides, in particular ethylene oxide and/or propylene oxide, onto H-functional initiator molecules.

At present, the preparation of polyether alcohols is carried out in batch processes in which the catalyst is suspended in the initiator substance.

Catalysts used are usually soluble basic metal hydroxides or salts, with potassium hydroxide having the greatest industrial importance. The major disadvantage of the use of potassium hydroxide as catalyst is that in the preparation of high molecular weight polyether alcohols it results in the formation of unsaturated by-products which reduce the functionality of the polyether alcohols and have a very adverse effect in the production of polyurethanes.

To lower the amount of unsaturated constituents in the product, EP-A 268 922 has proposed using cesium hydroxide as catalyst. However, the use of the expensive cesium hydroxide as catalyst makes the process less economical. Basic metal hydroxides which dissolve in the polyether polyols, e.g. potassium hydroxide and cesium hydroxide, have the further disadvantage that they have to be extracted from the polyetherol at great cost after the synthesis and the resulting waste has to be disposed of.

Another class of substances which are likewise suitable as catalysts for the preparation of polyether polyols is sparingly soluble basic oxides or hydroxides. Such basic oxides or hydroxides can be, for example, alkaline earth metal oxides or hydroxides. Thus, U.S. Pat. No. 5,679,764 describes the use of relatively coarse magnesium oxide powders as alkoxylation catalyst. The use of doped basic alkaline earth metal oxides or hydroxides, for example hydrotalcite, has also been described. A whole series of patents describes the preparation of fatty alcohol ethoxylates having a narrow molecular weight distribution using calcined or hydrophobicized hydrotalcite as catalyst. Representative examples of the large number of these patents are: DE-A 4 242 017, DE-A 4 137 317, DE-A 4 122 200, DE-A 4 115 149, DE-A 4 034 305, WO-A 94/11 331, WO-A 92/11 224, U.S. Pat. No. 4 962 237.

According to the patents cited, the alkoxylation of low molecular weight initiator substances is carried out using a suspension procedure. Use is made of more or less coarse powders which in most cases can be removed from the product only with great technical effort.

Catalysts comprising alkaline earth metal oxide/hydroxide can readily alkoxylate low molecular weight initiator substances and also readily ethoxylate high molecular weight initiator substances, but the reaction rate in the propoxylation of initiator substances having an intermediate molecular weight is very low.

To reduce the amount of unsaturated components in the polyether alcohols and to increase the reaction rate in the molecular addition of propylene oxide, the use of multimetal cyanide compounds, in particular zinc hexacyanometalates, as catalysts has been proposed. There is a large number of publications in which such compounds have been described. Thus, DD-A-203 734 and DD-A-203 735 describe a process for preparing polyether alcohols using zinc hexacyanocobaltate.

The preparation of the zinc hexacyanometalates is also known. It is usually carried out by reacting solutions of metal salts, usually zinc chloride, with solutions of alkali metal or alkaline earth metal cyanometalates, e.g. potassium hexacyanocobaltate. A water-miscible component containing one or more heteroatoms is normally added to the resulting precipitation suspension immediately after the precipitation procedure. This heteroatom-containing component can already be present in one or both starting solutions. The water-miscible, heteroatom-containing component is preferably an ether, polyether, alcohol, ketone or a mixture of at least two of the compounds mentioned. Such processes are described, for example, in U.S. Pat. Nos. 3,278,457, 3,278,458, 3,278,459, 3,427,256.

DD-A-148 957 describes the preparation of zinc hexacyanoiridate and its use as catalyst in the preparation of polyether alcohols. Here, hexacyanoiridic acid is used instead of the corresponding salt as one of the starting materials. The multimetal cyanide compounds prepared by means of an acid usually have a higher activity than those prepared from hexacyanometalate salts.

While multimetal cyano catalysts display high activities in the propoxylation of initiator molecules having molar masses greater than 400 dalton and can propoxylate them to give high molecular weight products, the reaction of low molecular weight initiator molecules is associated with considerable difficulties.

A particular disadvantage in the industrial use of multimetal cyanide catalysts is that the alkoxylation of low molecular weight initiator molecules is very difficult. There is often a delayed commencement of the reaction resulting in addition of too much alkylene oxide at the beginning. This can, apart from reducing the space-time yield, lead to serious safety problems in the production plants.

A further problem associated with the use of multimetal cyano catalysts is that the addition of ethylene oxide onto both high molecular weight and low molecular weight initiator molecules, for example to prepare polyetherols having ethylene oxide end blocks as are used, inter alia, for producing HR polyurethane foams, is not possible and the use of multimetal cyanide catalysts is therefore restricted to particular polyetherols.

A simple combination of both catalysts in one process by first reacting the initiator substance with alkylene oxide in the presence of a basic catalyst as far as a molecular weight at which a double metal cyanide catalyst can be used and then continuing the reaction using a double metal cyanide catalyst founders because, inter alia, the basic catalyst has to be removed virtually quantitatively since it acts as a catalyst poison for the multimetal cyanide catalysts. Even the alkali metal hydroxide contents remaining in the polyether alcohol after the customary work-up are too high for this purpose. When using insoluble catalysts suspended in the polyetherol, their removal is very difficult to carry out industrially if these catalysts have not been appropriately conditioned. In addition, the purification step during the preparation of polyetherols is an additional process step which leads to product losses, to a reduction in the space-time yield and to formation of waste materials which have to be disposed of.

It is an object of the present invention to develop a process for preparing polyether polyols which leads to polyetherols having a low content of unsaturated components, in which process the molecular addition of propylene oxide proceeds at a high reaction rate from reaction commencement to high molar masses and in which the incorporation of ethylene oxide end blocks can be carried out.

We have found that this object is achieved by a process for preparing polyetherols by ring-opening polymerization of alkylene oxides onto H-functional initiator molecules, which comprises at least one process step a) in which a compound of the formula (I)

$$M'_a M''_b (OH)_c O_d * A_e * L_f \quad (I),$$

where
- M' is a metal ion selected from groups IA, IIA of the Periodic Table and Ni or Zn, and mixtures thereof,
- M" is a metal ion selected from groups IIIA, IVA, IB to VIIIB of the Periodic Table and As, Sb and Bi, and mixtures thereof,
- A is at least one singly charged or multiply charged, inorganic or organic anion,
- L is at least one inorganic or organic ligand, where
- a is a rational number greater than zero,
- b, c, d, e, f are rational numbers greater than or equal to zero,
- c and d must not simultaneously be zero,
- a, b, c, d, e and f are selected such that the compound is electrically neutral, applied to a solid inert support or incorporated in th e latter or molded to form a shaped body is used as catalyst, and at least one process step b) in which a multimetal cyanide compound of the formula (II)

$$M^1_a [M^2(CN)_b (A)_c]_d \cdot fM^1_g X_n \cdot h(H_2O) \cdot eL \quad (II)$$

where
- $M^1$ is at least one metal ion selected from the group consisting of Zn2+, Fe2+, Co3+, Ni2+, Mn2+, Co2+, Sn2+, Pb2+, Mo4+, Mo6+, Al3+, V4+, V5+, Sr2+, W4+, W6+, Cr2+, Cr3+, Cd2+
- $M^2$ is at least one metal ion selected from the group consisting of Fe2+, Fe3+, Co2+, Co3+, Mn2+, Mn3+, V4+, V5+, Cr2+, Cr3+, Rh3+, Ru2+, Ir3+
- and $M^1$ and $M^2$ are identical or different,
- A is at least one anion selected from the group consisting of halide, hydroxide, sulfate, carbonate, cyanide, thiocyanate, isocyanate, cyanate, carboxylate, oxalate and nitrate,
- X is at least one anion selected from the group consisting of halide, hydroxide, sulfate, carbonate, cyanide, thiocyanate, isocyanate, cyanate, carboxylate, oxalate and nitrate,
- L is at least one water-miscible ligand selected from the group consisting of alcohols, aldehydes, ketones, ethers, polyethers, esters, ureas, amides, nitriles and sulfides, and
- a, b, c, d, g and n are selected such that the compound is electrically neutral, and
- e is the coordination number of the ligand,
- e and f are fractional numbers or integers greater than or equal to 0
- h is a fractional number or integer greater than or equal to 0, applied to a solid, inert support or incorporated in the latter or molded to form a shaped body or in powder or paste form is used as catalyst.

A process step a) is preferably carried out at the beginning of the reaction since the reaction rate in the alkylene oxide polymerization at the beginning of the reaction is greatest when using the catalysts of the formula (I). After reaching a molecular weight of preferably at least 400 dalton, a reaction step b) follows. This can extend to the end of the alkylene oxide addition reaction. However, it is also possible to add another reaction step a). This can be useful, for example, if an ethylene oxide block is to be added on, preferably at the end of the chain. The introduction of a reaction step b) can also be found to be useful if an ethylene oxide block is to be introduced within the chain and further propylene oxide is to be added on subsequently. The molecular addition of the propylene oxide can be carried out by means of process step b).

The process of the present invention for preparing polyether polyols can be carried out either as a suspension process or a fixed-bed process. If the process is carried out in the suspension mode, the removal of the catalyst has to be very simple in each individual step. It is preferred that the catalyst can be separated from the polyether polyol in each individual step by simple filtration or centrifugation operations. This can be achieved, for example, by the size of the catalyst particles being sufficiently large or by appropriate additions of filter aids. However, particular preference is given to the fixed-bed method. For this purpose, the catalysts used have to be immobilized so that they remain in the reactor and, if possible, only simple filtration operations are necessary to remove suspended material.

Catalysts used in step a) are, as indicated, compounds of the formula (I)

$$M'_a M''_b (OH)_c O_d * A_e * L_f \quad (I),$$

where the symbols are as defined above.

The compounds of the formula (I) can be used as powder or coarser granules in a suspension process. However, the active compositions for step a) and b) are preferably applied to solid supports, incorporated in the latter or molded to form shaped bodies.

The supports for the catalysts of the formula (I) used according to the present invention are macroscopic shaped bodies as are customary and known as catalyst supports, e.g. extrudates, granules, pellets, meshes, packing elements, woven fabrics, fibers, spheres and also the inner walls of reactors. The macroscopic shaped bodies can consist of inorganic and/or organic materials. Inorganic materials are, for example, oxides, carbides, nitrides or inert metals. Examples of carbides are transition metal carbides such as tungsten carbide, and also silicon carbide and boron carbide. Suitable nitrides are, for example, boron nitride, silicon nitride and aluminum nitride. For the purposes of the present invention, inert metals are metals or metal alloys which are inert toward the reaction medium in the polyether alcohol synthesis. Examples of inert metals are steels, aluminum, noble metals, nickel, stainless steels, titanium, tantalum and Kanthal. As oxides, it is possible to use metal oxides which are inert under said reaction conditions, particularly those of metals of groups IIA to IVA and IB to VIIIB, and also oxidic compounds comprising elements of groups IA to VIIA and/or the metals of groups IB to VIIIB.

The catalysts of the present invention can be produced by applying the compounds of type (I) to the surface of the shaped supports or by mixing compounds of type (I) with unmolded support material and subsequent shaping. It is also possible to mold pulverulent compounds of type (I) to produce unsupported catalysts. These unsupported catalysts can then be further processed to give coarser granules in order to be used, if desired, in a suspension process.

For preparing compounds of type (I), there is a large number of methods and possibilities.

Thus, these compounds can be prepared by coprecipitation. For 25 this purpose, a solution containing all the desired metal ions is made up and the ions are precipitated by addition of further reagents, for example by altering the pH by addition of a base. The precipitated solids can also be subjected to a hydrothermal treatment to induce further crystallization. Intimate mixing of the components by evaporation of the joint solution on a rotary evaporator is also possible. The materials prepared in this way can subsequently be dried and calcined.

Such compounds can also be prepared by impregnation or steeping. For this purpose, a solid which already comprises at least one of the desired components is treated with at least one solution which can comprise the other metal ions. After taking off the solvent, a drying and/or calcination step can likewise be carried out.

The solids obtained in this way can then be subjected to further treatments with organic or inorganic ligands.

Preferred compounds of type (I) are those in which M' comprises alkaline earth metal ions or zinc ions. Specific compounds which may be mentioned here are the pure oxides and hydroxides, for example magnesium oxide, calcium oxide, strontium oxide, barium oxide, zinc oxide, magnesium hydroxide, calcium hydroxide, strontium hydroxide, barium hydroxide or zinc hydroxide. However, apart from the pure oxides and hydroxides, there is a broad range of possible dopants, both on the cation and anion sides.

Doping with other cations such as the main group elements boron, aluminum, gallium, indium, thallium, silicon, germanium, tin, lead, arsenic, antimony and bismuth and also the transition elements of groups IB to VIIIB, in particular chromium, iron, lanthanum, manganese, scandium, yttrium, titanium and vanadium, enables a large number of compounds to be prepared. Anions which can be used are inorganic anions, for example halides and sulfur-phosphorus-, nitrogen- or carbon-containing anions, and also organic anions such as alkoxides, carboxylates, amides and sulfides and many more.

Doping of the pure oxides or hydroxides gives a large number of compounds. Only a few examples will be given here:

| | |
|---|---|
| Hydrotalcite | $[Mg_6Al_2(OH)_{16}]CO_3 \cdot 4\ H_2O$ |
| Takovite | $[Ni_6Al_2(OH)_{16}]CO_3 \cdot 4\ H_2O$ |
| Stichtite | $[Mg_6Cr_2(OH)_{16}]CO_3 \cdot 4\ H_2O$ |
| Hydrocalumite | $[Ca_2Al(OH)_6]OH \cdot 6\ H_2O$ |
| Magaldrate | $[Mg_{10}Al_5(OH)_{31}](SO_4)_2 \cdot m\ H_2O$ |
| Pyroaurite | $[Mg_6Al_2(OH)_{16}]CO_3 \cdot 4.5\ H_2O$ |
| Ettringite | $[Ca_6Al_2(OH)_{12}](SO_4)_3 \cdot 26\ H_2O$ |

The solids prepared as described above can be crystalline or amorphous. Crystalline compounds can be layer-lattice compounds such as hydrotalcite.

There are a number of methods which can be employed for molding the compounds of the formula (I).

One method of applying the compounds of the formula (I) to an inert shaped body comprises spraying a suspension of these compounds in an inert liquid. As a suspension for spraying, it is possible to use either the precipitation slurry of the compounds or the previously synthesized and possibly dried compound, suspended in a suitable suspension medium.

To increase the adhesion of the sprayed-on compound of type I to the shaped body, additional inorganic materials which act as binder can be added to the suspension for spraying.

The shaped bodies produced in this way can then be subjected to a calcination step. This can both have a positive effect on the adhesion to the shaped body and can also promote the formation of the active phase.

Furthermore, inorganic or organic materials which can react either thermally or photochemically, i.e. become crosslinked and thus enable the active composition to adhere strongly to the support, can be added in pure form, in the form of their solutions, dispersions or emulsions to increase the adhesion of the compounds of the formula (I) which have been sprayed on. Preference is given here to using reactive organic polymers whose crosslinking products form porous structures or reactive inorganic materials such as metalate esters.

These above-described methods of applying the compounds of the formula (I) to the support material can also be employed if the compounds of the formula (I) are to be applied to the internal walls of reactors.

Apart from spraying-on a suspension comprising compounds of the formula (I), the powder of these compounds can be applied directly to the shaped body using a method similar to a high-solids coating process, as described in DE 4 442 346. In this process, the shaped bodies are generally sprayed with an adhesion-promoting liquid in parallel with the supply of powder. As in the case of spraying, materials which act as binder and ensure increased adhesion of the active components to the shaped body can be added to the adhesion-promoting liquid.

Here too, it is possible to add reactive, i.e. crosslinking, inorganic organic or organic components.

A further method of applying the compounds of the formula (I) to the shaped body is to synthesize the compound or its precursor directly on the shaped body. For this purpose, the various solutions comprising the starting materials are brought into contact with the shaped body either simultaneously or at brief intervals. The shaped body can be brought into contact with the solutions by spraying, dipping, steeping, impregnation or similar procedures. The mixing of the liquids on the shaped body can result in precipitation of the active component or its precursor on the shaped body.

It is likewise possible to apply the desired metal ions by successive steeping or impregnation. The shaped bodies obtained in this way can, if necessary, be subjected to a hydrothermal crystallization. The shaped bodies obtained in this way can also be subjected to a heat treatment step should this be necessary to generate the compounds of the formula (I). Here too, adhesion-promoting materials can be added before or after the heat treatment step.

In the above-described processes for producing the catalysts of the present invention, the compounds of the formula (I) are applied to inert shaped bodies. However, it is also possible to produce molded compounds of the formula (I) by producing unsupported catalysts from the powders. This can be achieved by tabletting or extrusion. A choice will be made between application to inert shaped bodies as supports or molding to produce unsupported catalysts on the basis of the production costs for the compounds of the formula (I). When tabletting the oxidic compounds of the formula (I), it is generally necessary to add lubricants. These can be graphite, boron nitride or organic molecules such as stearates or alginates. Tabletting can also be followed by a heat treatment step in order to burn out the organic tabletting aids.

In the case of extrusion, the active composition powders can first be processed with a make-up liquid in a kneader, pan mill or similar apparatus to produce a plastic composition. In this compounding step, the composition being produced can be admixed with further ingredients which either improve the properties of the plastic composition in the actual shaping step or give the shaped body produced from this composition better cohesion. For the expert, there are a great number of possibilities for making use of various additives. The amounts of additives present are not critical: they should be high enough to be fully effective but not so high that the catalytic activity of the compounds of the formula (I) is reduced.

The shaped bodies obtained in this way can subsequently be converted into granules which can then also be used in a suspension process. The granules used then have particle sizes of from 100 μm to 2 mm, preferably from 250 μm to 1 mm.

A further possibility for producing the catalysts is to embed compounds of the formula (I) in a solid matrix. The solid matrix can be of an inorganic or organic nature.

To embed the compounds of the formula (I) in an inorganic matrix, the compounds of the formula (I) can be suspended in metalate esters or alkoxymetalates. Addition of bases or acids results in polymerization of the metalate esters to give solid materials. Preference is given here to the esters of silicic, aluminic, titanic and/or zirconic acids.

As organic components, it is possible to use all materials or material mixtures in which the compounds of the formula (I) can be suspended and which can be polymerized in any way to form solids.

The polymerization should be carried out in such a way that the solid particles formed can be used in a fixed-bed arrangement. Furthermore, the solid particles obtained should have sufficient porosity for the starting materials and products to be able to be transported to and from the active composition. To improve the porosity, it is possible to add, during the polymerization, auxiliaries which can be removed again by physical or chemical treatments after the polymerization. The polymerization can also be carried out in such a way as to produce an open-pored foam in which the active composition is fixed.

The catalysts for step b) are, in particular, multimetal cyanide catalysts of the formula

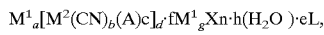

$$M^1_a[M^2(CN)_b(A)c]_d \cdot fM^1_g Xn \cdot h(H_2O) \cdot eL,$$

where

M$^1$ is at least one metal ion selected from the group consisting of Zn2+, Fe2+, Co3+, Ni2+, Mn2+, Co2+, Sn2+, Pb2+, Fe3+, Mo4+, Mo6+, Al3+, V4+, V5+, Sr2+, W4+, W6+, Cr2+, Cr3+, Cd2+, preferably consisting of Zn2+, Fe2+, Ni2+, Mn2+, Co2+ and Cr2+, particularly preferably Zn2+, M$^2$ is at least one metal ion selected from the group consisting of Fe2+, Fe3+, Co3+, Cr3+, Mn2+, Mn3+, Rh3+, Ru2+, Ru3+, V4+, V5+, Co2+, Ir3+ and Cr2+, preferably consisting of Co3+, Fe3+, Fe2+, Rh3+, Ir3+, particularly preferably Co3+, Rh3+, Ir3+ and Fe3+, identical to or different from M$^1$, A is at least one anion selected from the group consisting of halide, hydroxide, sulfate, carbonate, cyanide, thiocyanate, isocyanate, cyanate, carboxylate, oxalate and nitrate, X is at least one anion selected from the group consisting of halide, hydroxide, sulfate, carbonate, cyanide, thiocyanate, isocyanate, cyanate, carboxylate, oxalate and nitrate, L is at least one water-miscible organic ligand selected from the group consistin of alcohols, aldehydes, ketones, ethers, polyethers, esters, ureas, amides, nitrites and sulfides, a, b, c, d, g and n are selected such that the compound is electrically neutral, e is the coordination number of the ligand, e and f are fractional numbers or integers greater than or equal to zero, h is a fractional number or integer greater than or equal to zero.

These can again be used in powder form, paste form or in the form of relatively coarse granules for a suspension process. For the fixed-bed method, the double metal cyanides can, according to the present invention, be applied to solid supports, incorporated into the latter or molded to form shaped bodies.

The methods suitable for this have already been described in detail above.

The double metal cyanide complex can be prepared by customary methods. Such methods are described, for example, in U.S. Pat. Nos. 5,741,428, 5,693,584, 5,637,673, 5,627,122, 5,627,120, 5,589,431, 5,536,883, 5,482,908, 5,470,813.

The preparation of the polyethers is usually divided into the following process steps:

In process step a), lower alkylene oxides, in particular ethylene oxide and/or propylene oxide, are added onto H-functional initiator substances. H-functional initiator substances used in the process of the present invention are preferably alcohols, in particular those having from 1 to 8, but preferably 2 or 3, hydroxyl groups and from 2 to 6 carbon atoms in the molecule. Examples are glycols, in particular ethylene glycol and propylene glycol, and also glycerol, trimethylolpropane or pentaerythritol. It is also possible to use mixtures of alcohols with one another or with water. The addition of the alkylene oxides onto the initiator substances is carried out under the conditions customary for this purpose, i.e. at temperatures in the range from 80 to 150° C. and pressures in the range from 0.1 to 8 bar.

Before the alkylene oxides are metered in, the reaction mixture should be made inert by stripping with an inert gas, preferably nitrogen. The catalyst of the formula (I) can here be present as a fixed bed or a moving bed or be suspended in the initiator substance.

The commencement of the reaction can be recognized by a decrease in the pressure in the reactor.

After the alkylene oxide has reacted and, if appropriate, a further after-reaction time, the alkylene oxide reaction product is separated from the catalyst and worked up. To eliminate fine catalyst constituents and abraded material, the alkylene oxide reaction product can be filtered. To remove volatile constituents, the product is, as is customary, subjected to a distillation, preferably under reduced pressure.

The product of process step a) preferably has a molecular weight of from 100 to 1000 g/mol.

To carry out process step b), the final product of process step a) is admixed with a multimetal catalyst of the formula (II) and reacted with an alkylene oxide, in particular propylene oxide. The multimetal catalyst can likewise be applied to inert supports or be incorporated into the latter or molded to form shaped bodies, but it can also be present as a suspension in the reaction mixture. The reaction proceeds under the same reaction conditions as in process step a). The end product of process step b) has a molar mass of from 100 to 100,000, in particular from 35 1000 to 50,000.

The process step b) can be followed by a further process step a), in particular one using ethylene oxide as alkylene oxide. However, the molecular addition of an ethylene oxide end block can also be carried out using customary alkaline catalysts such as potassium hydroxide.

The polyetherols prepared by the process of the present invention have a low content of unsaturated compounds, even at high molar masses. The reaction proceeds in a very high space-time yield.

The polyetherols prepared by the process of the present invention are used, in particular, for producing polyurethanes.

The invention is illustrated by the following examples.
Production of Catalysts for Process Step a)

EXAMPLE 1

600 g of hydrotalcite (C300, Giulini) were compounded with 400g of boehmite (Pural® SB, Condea) and 610 ml of an aqueous formic acid solution (2% by weight of formic acid) for one hour in a kneader and extruded to produce round extrudates having a diameter of 2 mm. The extrudates were dried at 120° C. and calcined at 500° C. for 5 hours. Part of the extrudates obtained was converted into 1.6 mm granules for Example 6.

EXAMPLE 2

A solution of 175 g of sodium carbonate and 398 g of sodium hydroxide in 2 l of water was placed in a glass beaker and heated to 40° C. While stirring continually, a solution of 109 g of lithium nitrate and 1238 g of aluminum nitrate in 1.5 l of water was added over a period of 30 minutes. The resulting suspension was then stirred for a further 2 hours at 40° C. The solid formed was then filtered off with suction, washed with water and dried at 1100° C. for 16 hours.

EXAMPLE 3

120 g of powder from Example 2 were compounded with 80 g of boehmite (Pural® SB, Condea) and 59 ml of an aqueous formic acid solution (2% by weight of formic acid) for one hour in a kneader and extruded to produce round extrudates having a diameter of 2 mm. The extrudates were dried at 120° C. and calcined at 500° C. for 5 hours.

EXAMPLE 4

200 g of powder from Example 2 were compounded with 52 ml of an aqueous formic acid solution (2% by weight of formic acid) for one hour in a kneader and extruded to produce round extrudates having a diameter of 2 mm. The extrudates were dried at 120° C.

EXAMPLE 5

50 g of magnesium hydroxide carbonate (4 $MgCO_3 \cdot Mg(OH)_2$) were compounded with 33.3 g of boehmite (Pural® SB, Condea) and 78 ml of an aqueous formic acid solution (2% by weight of formic acid) for one hour in a kneader and extruded to produce round extrudates having a diameter of 2 mm. The extrudates were dried at 120° C. and calcined at 500° C. for 5 hours.

EXAMPLE 6

The synthesis was carried out in a cleaned and dried 5 l stirred reactor. At room temperature, 779.5 g of glycerol and 35.3 g of granulated catalyst as described in Example 1 were placed in the reactor. The contents of the reactor were then made inert by evacuating the reactor three times and filling it with nitrogen after each evacuation. At 95° C., a vacuum better than 1 mbar abs. was applied for 5 hours. Subsequently, a total of 1648 g of propylene oxide was added a little at a time at 125° C. at such a rate that an internal reactor pressure of 7.2 bar abs. was not exceeded. After the addition and reaction were complete, a water pump vacuum was applied for 30 minutes at 125° C. To separate off the catalyst, the reaction product was filtered through a double layer of a Seitz deep-bed filter. Analyses: OH number=588 mg KOH/g, viscosity=788 mPa*s (at 25° C.), unsaturated constituents=0.0226 meq/g, GPC: $M_n$=198.3 g/mol, $M_w$=208.9 g/mol, D=1.053.

EXAMPLE 7

The synthesis was carried out in a cleaned and dried 5 l stirred reactor. At 50° C., 303.2 g of the product from Example 6 were introduced. The contents of the reactor were made inert by evacuating three times and subsequently filling with nitrogen each time. Degassing was carried out by evacuation at less than 1 mbar abs. for 1.5 hours at 105° C. 1.589 g of a multimetal catalyst from the reaction of zinc acetate with hexacyanocobaltic acid were then added. The reactor was again evacuated three times and filled with nitrogen each time. This was followed by evacuation at less than 1 mbar abs. for 25 minutes at 125° C. At the same temperature, a nitrogen prepressure of 3.5 bar was applied and 195 g of propylene oxide and 29 g of ethylene oxide were added. The commencement of the reaction was recognized by the pressure drop. Subsequently, a mixture of 3996 g of propylene oxide and 570.5 g of ethylene oxide was metered in over a period of 3.3 hours. After a further 30 minutes at 125° C., the crude polyol was freed of volatile constituents under reduced pressure. The catalyst was separated off by filtration through a double layer of a Seitz deep-bed filter. Analyses: OH number=35.8 mg KOH/g, viscosity=1024 mPa*s (at 25° C.), unsaturated constituents= 0.0028 meq/g, GPC: $M_n$=3525 g/mol, $M_w$=3673 g/mol, D=1.042.

We claim:

1. A process for preparing polyetherols by ring-opening polymerization of alkylene oxides onto H-functional initiator molecules, which comprises at least one process step a) in which a compound of the formula (I)

$$M'_a M''_b (OH)_c\ O_d {}^* A_e {}^* L_f \tag{I}$$

where

M' is a metal ion selected from groups IA, IIA of the Periodic Table and Ni or Zn, and mixtures thereof, M" is a metal ion selected from groups IIIA, IVA, IB to VIIIB of the Periodic Table and As, Sb and Bi, and mixtures thereof, A is at least one singly charged or multiply charged, inorganic or organic anion, L is at least one inorganic or organic ligand, where a, b are rational numbers greater than zero, c, d, e, f are rational numbers greater than or equal to zero, c and d must not simultaneously be zero, a, b, c, d, e and f are selected such that the compound is electrically neutral, applied to a solid inert support or incorporated in the latter or molded to form a shaped body is used as catalyst, and at least one process step b) in which a multimetal cyanide compound of the formula (II)

$$M^1_a [M^2(CN)_b (A)_c]_d {\cdot} f M^1_g X_n {\cdot} h(H_2O) {\cdot} eL \tag{II}$$

where

M$^1$ is at least one metal ion selected from the group consisting of Zn2+, Fe2+, Co3+, Ni2+, Mn2+, Co2+, Sn2+, Pb2+, Mo4+, Mo6+, Al3+, V4+, V5+, Sr2+, W4+, W6+, Cr2+, Cr3+, Cd2+, M$^2$ is at least one metal ion selected from the group consisting of Fe2+, Fe3+, Co2+, Co3+, Mn2+, Mn3+, V4+, V5+, Cr2+, Cr3+, Rh3+, Ru2+, Ir3+ and M$^1$ and M$^2$ are identical or different, A is at least one anion selected from the group consisting of halide, hydroxide, sulfate, carbonate, cyanide, thiocyanate, isocyanate, cyanate, carboxylate, oxalate and nitrate, X is at least one anion selected from the group consisting of halide, hydroxide, sulfate, carbonate, cyanide, thiocyanate, isocyanate, cyanate, carboxylate, oxalate and nitrate, L is at least one water-miscible ligand selected from the group consisting of alcohols, aldehydes, ketones, ethers, polyethers, esters, ureas, amides, nitriles and sulfides, and a, b, c, d, g, and n are selected such that the compound is electrically neutral, and e is the coordination number of the ligand, e and f are fractional numbers or integers greater than or equal to 0, h is a fractional number of integer greater than or equal to 0, applied to a solid, inert support or incorporated in the latter or molded to form a shaped body or in powder or paste form is used as catalyst.

2. A process as claimed in claim 1, wherein alkylene oxide is first added onto the initiator molecule in a process step a) and a process step b) is then carried out.

3. A process as claimed in claim 1, wherein alkylene oxide is first added onto the initiator molecule in a process step a), a process step b) is then carried out and another process step a) is carried out subsequently.

4. A process as claimed in claim 1, wherein the alkylene oxide used in process step a) is ethylene oxide and/or propylene oxide and the alkylene oxide used in process step b) is propylene oxide.

5. A process as claimed in claim 1, wherein the alkylene oxide used for carrying out process step a) at the end of the process is ethylene oxide.

* * * * *